Jan. 22, 1957 A. W. PLOEGSMA 2,778,250
ENVELOPED DIAMOND DIE AND METHOD OF MAKING SAME
Filed Jan. 16, 1951
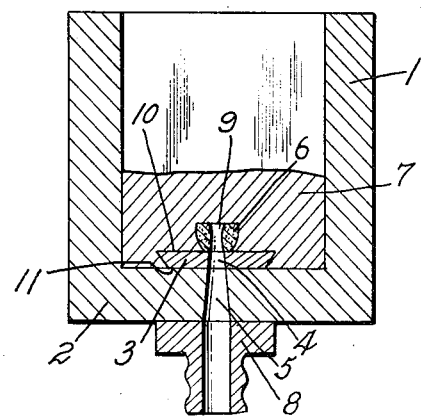
INVENTORS
ANTONIE W. PLOEGSMA
BY AGENT

2,778,250
ENVELOPED DIAMOND DIE AND METHOD OF MAKING SAME

Antonie Wobbe Ploegsma, Eindhoven, Netherlands, assignor to Hartford National Bank and Trust Company, Hartford, Conn., as trustee Application January 16, 1951, Serial No. 206,241

Claims priority, application Netherlands February 16, 1950

1 Claim. (Cl. 76—107)

The invention relates to methods of manufacturing envelopes for diamond dies and to diamond dies comprising envelopes manufactured by this method.

It is known to set such a diamond in a steel envelope and to draw the assembly thus formed through a die. However, this method has a limitation in that the steel envelope and hence also the diamond are exposed to heavy forces, while it cannot be ascertained fully whether the envelope actually embraces the diamond throughout. In view of the great forces occurring in the diamond during the drawing operations, complete embracement of the diamond by the envelope has been proven to be necessary to prevent splitting of the diamond. It has previously been suggested to use sintered material of a metallic nature as an envelope for the diamond. In such case, the mass is poured in the unsintered state into a mould and subsequently sintered together under pressure at a high temperature of about 1000° C. In order to prevent the diamond from being affected, the temperature limits and the period of sintering have to be accurately determined and observed, which can only be effected by skilled labour. It is furthermore known to envelope a diamond with a mixture of baked sodium-silicate, copper or powdery brass and a small quantity of zinc. However, this envelope has been found to be insufficiently rigid.

According to the present invention, the method of manufacturing an envelope for a diamond die is characterized in that the diamond is arranged with a flat part thereof on a suitable surface of a plate. Subsequently, the plate and the diamond are placed in a mould, and then the mould is filled up with a material which has substantially the same melting temperature and the same coefficient of expansion as the plate supporting the diamond. It has been found that a diamond die manufactured by this method is rigidly fixed in its envelope and does not become loose at the temperatures to which the diamond is exposed during the drawing process, nor during the subsequent cooling. It should be noted that both the diamond and the plate are preferably provided with a bore before being placed in the mould.

According to a preferred embodiment of the invention, the bottom of the mould is provided with an aperture. The supporting plate and the diamond are then placed in the mould in such manner that the center lines of the apertures provided in the diamond, in the supporting plate and in the mould coincide. Then, the aperture in the mould is connected to a conduit, in which a negative pressure prevails, the connection being maintained until the material poured into the mould has solidified. It is found that, in taking this step, the diamond and the plate remain in their correct positions during the casting operation and that a homogeneous casting without flaws is obtained having all voids filled up completely.

It has further been found advantageous if, in another embodiment of the invention, the surface of the plate supporting the diamond is larger than the opposite surface of this plate. It is obvious that, when such a step is included, the plate and thus the diamond cannot be removed from the envelope without destroying the envelope. Furthermore, if the cast material shrinks, the plate will be secured the more rigidly.

In a further embodiment of the invention, the plate is preferably made of a material similar to that poured into the mould. This ensures satisfactory adherence of the material to the plate.

Finally, in a still further embodiment of the invention, it is advantageous that both the material to be cast and the plate consist of cast iron having a silicon content of approximately 3%. The melting temperature of this material is sufficiently low to prevent the diamond from being damaged in view of the short period of solidification, while the fluidity of the material in the hot state is such that the latter is capable of penetrating into all crevices in the diamond and plate. An important advantage of this embodiment of the invention is that, due to the expansion upon solidification of cast iron, the diamond is tightly enclosed. Such enclosure is then maintained during the subsequent shrinkage.

In order that the invention may be more clearly understood and readily carried into effect, it will now be described more fully with reference to the accompanying drawing, in which the sole figure shows one embodiment by way of example.

Referring to the figure, reference numeral 1 designates a mould having a flat bottom 2. This bottom supports a plate 3, provided with an aperture 4. The bottom 2 of the mould also has an aperture 5. The plate 3 supports a diamond 6, which is already provided with a bore 9. The plate 3 is circular in shape, but the diameter of the surface 10 supporting the diamond 6 exceeds that of the surface 11 engaging the bottom 2 of the mould. A mass 7 is poured into the mould. Prior to and during the casting operation, a vacuum pipe is connected by way of a hose (neither of which is shown) with a junction piece 8, secured to the bottom 2 of the mould. The plate 3 and the mass 7 are preferably of cast iron having a silicon content of approximately 3%. It is not necessary that the diamond should be bored prior to the pouring operation, but it is advisable to do so with a view toward a more simple manufacture of the finished product. The molten mass 7 poured into the mould is drawn by a negative pressure in the bore of the diamond but this material is immediately cooled and solidified so that none of the material is drawn through and out of the mould. Due to the continuing negative pressure applied to the mould both the diamond and the plate are kept in place. Since a diamond die is very small in size only a small amount of negative pressure is necessary for keeping the diamond and plate in place. Furthermore when the molten mass is cast in the mould, a part thereof is drawn by negative pressure into the bore. The part solidifies immediately, as stated above, and this naturally aids in maintaining the diamond in its correct position.

Having described a preferred form of the present invention and certain modifications thereof, it will be evident that various changes therein may be made by persons skilled in the art without departing from the spirit and scope of the present invention. Consequently, it is to be understood that the foregoing description is to be considered illustrative of, rather than limitative upon, the appended claim.

What I claim is:

A method of manufacturing an envelope for diamond dies comprising the steps of: placing a diamond with a flat portion thereof on the flat surface of a plate and providing an aligned bore through said diamond and said plate, placing said plate with said diamond thereon in a mould which has a diameter substantially greater than that of the plate and which is provided with an aperture so that said aperture aligns with the bores of said diamond and said plate, filling said mould with a molten material having substantially the same melting temperature and the same coefficient of expansion as does said plate, and applying a negative pressure to said mould via said aligned aperture and bores until said material has substantially solidified.

References Cited in the file of this patent

UNITED STATES PATENTS

| | | |
|---|---|---|
| 362,789 | Sawyer | May 10, 1887 |
| 751,180 | Krause | Feb. 2, 1904 |
| 1,056,694 | Krause | Mar. 18, 1913 |
| 2,025,368 | Wissler | Dec. 24, 1935 |
| 2,125,332 | Bursell | Aug. 2, 1938 |
| 2,126,058 | Taylor | Aug. 9, 1938 |
| 2,147,843 | Jamar et al. | Feb. 21, 1939 |
| 2,216,652 | Romp | Oct. 1, 1940 |
| 2,232,417 | Unckel | Feb. 18, 1941 |
| 2,236,288 | Engle et al. | Mar. 25, 1941 |
| 2,355,853 | Foxon | Aug. 15, 1944 |
| 2,363,406 | Ferrier | Nov. 21, 1944 |
| 2,364,005 | Simons | Nov. 28, 1944 |

FOREIGN PATENTS

| | | |
|---|---|---|
| 259,929 | Germany | May 14, 1913 |
| 476,781 | Great Britain | Dec. 15, 1937 |